(12) United States Patent
Graves et al.

(10) Patent No.: US 11,965,091 B2
(45) Date of Patent: Apr. 23, 2024

(54) BIOCIDE FREE ASSOCIATIVE THICKENER

(71) Applicant: Rohm and Haas Company, Collegeville, PA (US)

(72) Inventors: Deborah D. Graves, Blue Bell, PA (US); Jessica R. Levin, Philadelphia, PA (US); John J. Rabasco, Allentown, PA (US); Wenqin Wang, Phoenixville, PA (US); Adrian R. Ward, Oxford, PA (US)

(73) Assignee: Rohm and Haas Company, Collegeville, PA (US)

( * ) Notice: Subject to any disclaimer, the term of this patent is extended or adjusted under 35 U.S.C. 154(b) by 722 days.

(21) Appl. No.: 16/924,391

(22) Filed: Jul. 9, 2020

(65) Prior Publication Data

US 2021/0017380 A1 Jan. 21, 2021

Related U.S. Application Data

(60) Provisional application No. 62/875,157, filed on Jul. 17, 2019.

(51) Int. Cl.
| | | |
|---|---|---|
| *C08L 71/02* | (2006.01) | |
| *C08G 18/08* | (2006.01) | |
| *C08G 18/28* | (2006.01) | |
| *C08G 65/325* | (2006.01) | |
| *C08G 65/327* | (2006.01) | |
| *C08K 5/521* | (2006.01) | |
| *C08L 75/08* | (2006.01) | |
| *C08L 75/12* | (2006.01) | |
| *C09D 7/43* | (2018.01) | |

(52) U.S. Cl.
CPC .......... *C08L 71/02* (2013.01); *C08G 18/0814* (2013.01); *C08G 18/2875* (2013.01); *C08G 65/3255* (2013.01); *C08G 65/327* (2013.01); *C08K 5/521* (2013.01); *C08L 75/08* (2013.01); *C08L 75/12* (2013.01); *C09D 7/43* (2018.01)

(58) Field of Classification Search
CPC ............ C08G 18/0814; C08G 18/2875; C08G 65/3255; C08G 65/327; C08K 5/521; C08L 71/02; C08L 75/08; C08L 75/12; C09D 7/43
See application file for complete search history.

(56) References Cited

U.S. PATENT DOCUMENTS

| | | | | |
|---|---|---|---|---|
| 7,741,402 | B2 * | 6/2010 | Bobsein | C09D 7/43 524/48 |
| 2008/0234411 | A1 | 9/2008 | Bobsein et al. | |
| 2010/0261813 | A1 | 10/2010 | Bobsein et al. | |
| 2012/0130000 | A1 * | 5/2012 | Rabasco | C08G 18/2875 528/85 |

FOREIGN PATENT DOCUMENTS

| | | |
|---|---|---|
| EP | 265364 B1 | 3/1993 |
| EP | 2455412 A1 | 5/2012 |
| EP | 2653463 A1 | 10/2013 |
| EP | 2653464 A1 | 10/2013 |
| WO | 2017112449 A1 | 6/2017 |

* cited by examiner

*Primary Examiner* — James C Goloboy
(74) *Attorney, Agent, or Firm* — Reid S. Willis

(57) ABSTRACT

The present invention relates to a composition comprising an aqueous solution of a) a hydrophobically modified alkylene oxide polymer comprising a hydrophobic portion functionalized with a protonated secondary or tertiary amine or a quaternary ammonium salt and b) an acid and a salt thereof, which acid is phosphoric acid, nitrilotris(methylene) triphosphonic acid, hydrochloric acid, or sulfuric acid. The composition of the present invention is useful for the preparation of an associative thickener that can be stored for long periods, in the absence of ancillary biocides, without spoilage from biodeteriogenic attack.

4 Claims, No Drawings

BIOCIDE FREE ASSOCIATIVE THICKENER

BACKGROUND OF THE INVENTION

The present invention relates to a hydrophobically modified alkylene oxide polymer thickener that is resistant to microbial growth in the absence of a biocide.

Hydrophobically modified ethylene oxide polymers such as hydrophobically modified ethylene oxide urethane polymers (HEURs) are associative thickeners used to control the viscosity of waterborne paint formulations. HEURs, which are supplied as aqueous solutions, require a biocide, typically an isothiazolinone-based biocide such as 2-methyl-4-isothiazolin-3-one (MIT) to maintain product quality during storage by suppressing spoilage arising from microbial growth. Nevertheless, the European Biocidal Product Review (BPR) is expected in the near future to reduce the maximum allowed level of MIT in consumer products, including paints, to 15 ppm, a level below MIT's biocidal efficacy. The increased regulatory scrutiny of biocide usage, coupled with growing concerns by consumers on the safety of biocides, have left formulators with few options on preparing paints with the long shelf lives that consumers currently take for granted. Accordingly, it would be advantageous to discover a biocide-free associative thickener that is inhospitable to microbial growth.

SUMMARY OF THE INVENTION

The present invention addresses a need in the art by providing a composition comprising an aqueous solution of a) a hydrophobically modified alkylene oxide polymer comprising a hydrophobic portion functionalized with a protonated secondary or protonated tertiary amine or a quaternary ammonium salt and b) an acid and a salt thereof, which acid is phosphoric acid, nitrilotris(methylene)triphosphonic acid, hydrochloric acid, or sulfuric acid, wherein the mole-to-mole ratio of the acid and the acid salt thereof to the functionalized hydrophobic portion to the is in the range of from 0.3:1 to 5:1, with the proviso that when the acid is phosphoric acid, the mole-to-mole ratio of the phosphoric acid and the salt thereof to the functionalized hydrophobic portion is in the range of from 0.8:1 to 5:1. The composition of the present invention addresses a need in the art by providing a biocide free associative thickener that resists biodeterioration.

DETAILED DESCRIPTION OF THE INVENTION

The present invention is a composition comprising an aqueous solution of a) a hydrophobically modified alkylene oxide polymer comprising a hydrophobic portion functionalized with a protonated secondary or protonated tertiary amine or a quaternary ammonium salt and b) an acid and a salt thereof, which acid is phosphoric acid, nitrilotris(methylene)triphosphonic acid, hydrochloric acid, or sulfuric acid, wherein the mole-to-mole ratio of the acid and the acid salt thereof to the functionalized hydrophobic portion is in the range of from 0.3:1 to 5:1, with the proviso that when the acid is phosphoric acid, the mole-to-mole ratio of the phosphoric acid and the salt thereof to the functionalized hydrophobic portion is in the range of from 0.8:1 to 5:1.

As used herein, the term "alkylene oxide polymer" refers to water-soluble polyethylene oxide polymers, as well as water-soluble polyethylene oxide/polypropylene oxide and polyethylene oxide/polybutylene oxide copolymers. Preferably, the alkylene oxide polymer is an alkylene oxide urethane polymer, more preferably an ethylene oxide urethane polymer.

The preferred hydrophobically modified alkylene oxide urethane polymer is conveniently prepared by contacting under suitable reactive conditions, a) a water-soluble polyalkylene glycol; b) a stoichiometric excess of a diisocyanate relative to the polyalkylene glycol; and c) a hydrophobic compound functionalized with a secondary or a tertiary amine or a quaternary ammonium salt to form the hydrophobically modified alkylene oxide urethane polymer. Component b) may also be dichloromethane, dibromomethane, epichlorohydrin, or an aminoplast instead of a diisocyanate.

A water-soluble polyalkylene glycol refers to water-soluble polyethylene oxides, water-soluble polyethylene oxide/polypropylene oxide copolymers, and water-soluble polyethylene oxide/polybutylene oxide copolymers. Preferred water-soluble polyalkylene oxides are polyethylene glycols, particularly polyethylene glycols having a weight average molecular weight in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol (a trademark of The Dow Chemical Company ("Dow") or an affiliate of Dow, Midland, MI).

Examples of diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, and m- and p-phenylene diisocyanates.

As used herein, the term "hydrophobic portion" refers to the hydrophobic compound except for the hydrogen atom or atoms associated with group or groups that react with the isocyanate portion of the preferred alkylene oxide polymer backbone. For example, if the hydrophobic compound used to form the hydrophobic portion is 2-(dibutylamino) ethanol, the hydrophobic portion is characterized by the following formula:

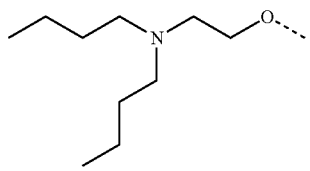

where the dotted line represents the point of attachment to the alkylene oxide polymer backbone. If the hydrophobic compound used to form the hydrophobic portion is 2-(dibutylamino) ethylamine, for example, the hydrophobic portion is characterized by the following formula:

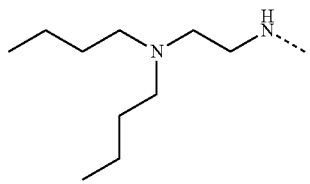

In the first example, the hydrophobic compound reacts with, for example, an isocyanate group to form a carbamate group; in the second instance, the hydrophobic compound reacts with an isocyanate group to form a urea group.

Examples of hydrophobic compounds that can be used to generate hydrophobic groups include 2-(diethylamino)ethanol; 2-(t-butylamino)ethanol; 2-(dibutylamino)ethanol; 2-(dipentylamino)ethanol; 2-(dioctylamino)ethanol; 2-(diheptylamino)ethanol; 2-(bis(2-ethylhexyl)amino)ethanol; 2-(dihexylamino)ethanol; 3-(dibutylamino)propanol; 4-(dimethylamino)-1-butanol; 2-(dibutylamino)ethylamine; 3-(dibutylamino)propylamine; 1-dimethylamino-2-propanol 2-(diisopropylamino)ethanol; dibenzylaminoethanol; 2-(dimethylamino)ethanol 3-(dimethylamino)-1,2-propanediol; N-benzyl-N-methylethanolamine; N-methyldiethanolamine; N-butyldiethanolamine; 1-(dibutylamine)-2-butanol; 4-amino-1-benzyl-piperidine; N-phenyldiethanolamine; 1-(benzyl(2-hydroxyethyl)amino)-3-alkoxypropan-2-ols such as 1-(benzyl(2-hydroxyethyl)amino)-3-butoxypropan-2-ol and 1-(benzyl(2-hydroxyethyl)amino)-3-(2-ethylhexyl)oxypropan-2-ol; 1-[bis(phenylmethyl)amino]-3-[(2-alkoxy]-2-propanols such as 1-[bis(phenylmethyl)amino]-3-[(2-butyl)oxyl]-2-propanol and 1-[bis(phenylmethyl)amino]-3-[(2-ethylhexyl)oxyl]-2-propanol; and dibenzylaminopolyalkylene oxides of the type:

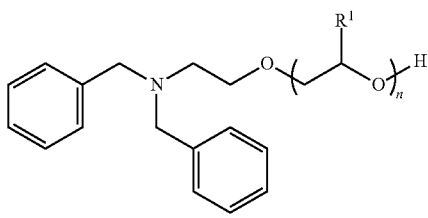

where $R^1$ is methyl or ethyl and n is from 1 to 10.

The composition of the present invention is conveniently prepared by contacting the hydrophobically modified alkylene oxide polymer, preferably a hydrophobically modified ethylene oxide urethane polymer (HEUR) with water and phosphoric acid, nitrilotris(methylene)triphosphonic acid, hydrochloric acid, or sulfuric acid. The mole:mole ratio of the acid portion to the hydrophobic portion (acid:hydrophobe) varies depending on which acid is used. When phosphoric acid is used, this mole:mole ratio of acid:hydrophobe is in the range of from 0.8:1, more preferably from 0.9:1, and most preferably from 1:1 to 5:1, more preferably to 4.5:1, more preferably to 4.1:1, most preferably to 2.5:1; for nitrilotris(methylene)triphosphonic acid, hydrochloric acid, or sulfuric acid, the mole:mole ratio is in the range of from 0.3:1, more preferably from 0.5:1, to 5:1, more preferably to 4.5:1, more preferably to 2.5:1.

The composition of the present invention is useful in coating formulations, especially pigmented paint formulations, and may further comprise other components including binders, pigments such as $TiO_2$, opaque polymers, surfactants, coalescents, defoamers, and extenders.

Compositions within and outside the scope of the present invention were tested for microbial growth susceptibility using a series of microbial challenge tests. Two features stand out from these tests: First, only phosphoric acid, nitrilotris(methylene)triphosphonic acid, hydrochloric acid, and sulfuric acid were found to create an environment unfavorable to microbial growth among a representative group of strong and weak acids. Second, it has been discovered that these acids that do suppress microbial growth are effective over a very narrow pH range of from 2.0, preferably from 2.1; to 3.2, preferably to 3.0, more preferably to 2.8, and most preferably to 2.7. The rheology modifiers of the present invention can be stored for long periods, in the absence of ancillary biocides, without biodeteriogenic spoilage.

Samples were inoculated 2 times at 7-d intervals with $10^6$-$10^7$ colony forming units per milliliter of sample (CFU/mL) of a standard pool of bacteria, yeasts, and molds obtained from American Type Culture Collection (ATCC) that are common contaminants in coatings. Once inoculated, the samples were stored in 25° C. incubators. Test samples were monitored for microbial contamination by agar plating using a standard streak plate method. Samples were plated 1 and 7 day after each microbial challenge onto trypticase soy agar (TSA) and potato dextrose agar (PDA) plates. All agar plates were checked daily up to 7 d after plating to determine the number of microorganisms surviving in the test samples. When not being checked, the agar plates were stored in incubators, 30° C. for TSA plates and 25° C. for PDA plates. The extent of microbial contamination was established by counting the colonies, where the rating score was determined from the number of microbial colonies observed on the agar plates. Reported results come from day 7 readings. Table 1 illustrates the rating system used to estimate the level of microbial contamination on streak plates. Colonies refers to the number of colonies on the plate.

TABLE 1

Rating system for estimating microbial contamination

| Colonies | Rating Score | Contamination | Result |
| --- | --- | --- | --- |
| None | 0 | None | Pass |
| 1-9 | Tr | Trace | Borderline |
| 10 to 99 | 1 | Very Light | Fail |
| 100 to ~1000 | 2 | Light | Fail |
| ~1000 to 10,000 | 3 | Moderate | Fail |
| >10,000 | 4 | Heavy | Fail |

As-Is Viscosity Measurements

As-is viscosities of the rheology modifier samples were measured on a Brookfield viscometer using spindle 4 at 60 RPM.

EXAMPLES

Intermediate 1—Preparation of 2-Propanol, 1-[bis(phenylmethyl)amino]-3-[(2-butyl)oxyl]-

Dibenzylamine (424 g), butyl glycidyl ether (307 g) and water (20 g) were heated to reflux under $N_2$ in a round bottom flask equipped with a condenser and mechanical stirrer. After 6 h, the mixture was cooled to 30° C. Product was isolated after water and residual butyl glycidyl ether were removed in vacuo (15 mm Hg) over a temperature range of 30–150° C.

Intermediate 2—Preparation of 1-(Benzyl(2-hydroxyethyl)amino)-2-((2-ethylhexyl)oxy)ethanol N-Benzylethanolamine (200.6 g) and 2-ethylhexyl glycidyl ether (250.0 g) were heated to 100° C. under $N_2$ in a round bottom flask equipped with a condenser and mechanical stirrer. After stirring for 3 h, the reaction mixture was cooled to room temperature. The resulting diol product was used without further purification.

Intermediate 3—Preparation of 2-Propanol, 1-[bis(phenylmethyl)amino]-3-[(2-ethylhexyl)oxyl]-

Dibenzylamine (824 g) and 2-ethylhexyl glycidyl ether (795.5 g) were heated to 130° C. under a nitrogen atmosphere in a round bottom flask equipped with a condenser and mechanical stirrer.

After 13 h, the mixture was cooled to 30° C. and the yellow oil product isolated without purification.

Example 1—Preparation of Phosphoric Acid-Treated HEUR Hydrophobically Modified with Intermediate 1

CARBOWAX™ 8000 Polyethylene Glycol (PEG, a trademark of the Dow Chemical Company or its Affiliates, 1700 g) was heated to 110° C. in vacuo in a batch melt reactor for 2 h. After cooling the reactor to 85° C., butylated hydroxytoluene (BHT, 0.2 g), Intermediate 1 (54.4 g, 2.4×$10^{-3}$ mol of hydrophobe), hexamethylene diisocyanate (HDI, 41.6 g), and Desmodur N3600 (8.2 g) were added to the reactor and the reaction mixture was stirred for 5 min. Bismuth octoate (28% Bi, 4.0 g) was then added to the reactor and the resulting mixture was stirred for 10 min at 85° C. The resulting molten polymer was removed from the reactor and cooled. A portion of this solid polymer (11.7 g) was then dissolved in 10% phosphoric acid (4.0 g, 9.2×$10^{-3}$ mol) and water (29.2 g) to form a solution prior to other testing. HEUR polymer solids was 26%, based on the weight of water and HEUR.

Example 2—Preparation of Phosphoric Acid-Treated HEUR Hydrophobically Modified with Intermediates 2 and 3

CARBOWAX™ 8000 Polyethylene Glycol (1700 g) was heated to 110° C. in vacuo in a batch melt reactor for 2 h. Intermediate 2 (33.5 g, 2.1×$10^{-3}$ mol of hydrophobe) and Intermediate 3 (50.3 g) were then added to the reactor and mixed for 5 min. Hexamethylene diisocyanate (HDI, 56.7 g) was then added to the reactor and the reaction mixture was stirred for 5 min, after which time bismuth octoate (28% Bi, 6.0 g) was added to the reactor. The mixture was stirred for 10 min at 110° C. The resulting molten polymer was removed from the reactor and cooled. A portion of this solid polymer (7.6 g) was then dissolved in 10% phosphoric acid (4.0 g, 9.2×$10^{-3}$ mol) and water (33.3 g) to form a solution prior to other testing. HEUR polymer solids was 17%, based on the weight of water and HEUR.

Example 3—Preparation of Phosphoric Acid-Treated HEUR Hydrophobically Modified with Bis(2-ethylhexyl)aminoethanol CARBOWAX™ 8000 Polyethylene Glycol (1709.8 g) was heated to 110° C. in vacuo in a batch melt reactor for 2 h. Bis(2-ethylhexyl)aminoethanol (91.6 g, 3.9×$10^{-3}$ mol of hydrophobe) was added to the reactor and allowed to mix for 5 min. IPDI (78.4 g) was then added to the reactor and mixed for 5 min, after which time bismuth octoate (28% Bi, 4.3 g) was added to the reactor. The mixture was then held at 110° C. with stirring for 20 min. The resulting molten polymer was removed from the reactor and cooled. A portion of this solid polymer (12.2 g) was then dissolved in 10% phosphoric acid (4.0 g, 9.2×$10^{-3}$ mol) and water (28.8 g) to form a solution prior to other testing. HEUR polymer solids was 27%, based on the weight of water and the HEUR.

Example 4—Preparation of Phosphoric Acid-Treated HEUR Hydrophobically Modified with Bis(2-ethylhexyl)aminoethanol and a Methoxy Polyethylene Glycol CARBOWAX™ 8000 Polyethylene Glycol (1700 g) was heated to 110° C. in vacuo in a batch melt reactor for 2 h. Desmodur W (H12MDI, 171.1 g) was added to the reactor followed by 5 min of stirring. Bismuth octoate solution (28% Bi, 5.1 g) was then added to the reactor and the resulting mixture was stirred for 10 min. MPEG 2000 methoxy polyethylene glycol (165.7 g) and bis(2-ethylhexyl)aminoethanol (246.6 g, 7.6×$10^{-3}$ mol of hydrophobe) were added to the reactor followed by 10 min of stirring. The resulting molten polymer was removed from the reactor and cooled. A portion of this solid polymer (4.0 g, 9.2×$10^{-3}$ mol) was then dissolved in 10% phosphoric acid (4.0 g, 9.2×$10^{-3}$ mol) and water (32.0 g) to form a solution prior to other testing. HEUR polymer solids was 20%.

Example 5—Preparation of Phosphoric Acid-Treated HEUR Hydrophobically Modified with Bis(2-ethylhexyl)aminoethanol and a Methoxy Polyethylene Glycol Example 5 was prepared substantially as described in Example 4 except that the solid polymer (9.0 g) was dissolved in 10% phosphoric acid (2.9 g, 6.6×$10^{-3}$ mol of hydrophobe) in water (33.1 g) to form a solution prior to other testing.

Example 6—Preparation of Hydrochloric Acid-Treated HEUR Hydrophobically Modified with Bis(2-ethylhexyl)aminoethanol and a Methoxy Polyethylene Glycol Example 6 was prepared substantially as described in Example 4 except that the solid polymer (9.0 g) was dissolved in 3.6% hydrochloric acid (5.0 g, 1.1×$10^{-2}$ mol) in water (31.0 g) to form a solution prior to other testing.

Example 7—Preparation of Sulfuric Acid-Treated HEUR Hydrophobically Modified with Bis(2-ethylhexyl)aminoethanol and a Methoxy Polyethylene Glycol Example 7 was prepared substantially as described in Example 4 except that the solid polymer (9.0 g) was dissolved in 96.5% sulfuric acid (0.2 g, 4.1×$10^{-3}$ mol) in water (35.8 g) to form a solution prior to other testing.

Example 8—Preparation of a Phosphonic Acid-Treated HEUR Hydrophobically Modified with Bis(2-ethylhexyl)aminoethanol and a Methoxy Polyethylene Glycol Example 8 was prepared substantially as described in Example 4 except that the solid polymer (9.0 g) was dissolved in 50% nitrilotris(methylene)triphosphonic acid (0.8 g, 3.0×$10^{-3}$ mol) in water (35.2 g) to form a solution prior to other testing.

Comparative Example 1—Preparation of Polyacrylic Acid-Treated HEUR Hydrophobically Modified with Bis(2-ethylhexyl)aminoethanol and a Methoxy Polyethylene Glycol Comparative Example 1 was prepared substantially as described in Example 4 except that the solid polymer (9.0 g) was dissolved in 46% polyacrylic acid (3.4 g, $1.0 \times 10^{-3}$ mol) and water (32.6 g) to form a solution prior to other testing.

Comparative Example 2—Preparation of Citric Acid-Treated HEUR Hydrophobically Modified with Bis(2-ethylhexyl)aminoethanol and a Methoxy Polyethylene Glycol Comparative Example 2 was prepared substantially as described in Example 4 except that the solid polymer (9.0 g) was dissolved in citric acid (1.6 g, $1.8 \times 10^{-2}$ mol) and water (34.4 g) to form a solution prior to other testing.

Comparative Example 3—Preparation of p-Toluenesulfonic Acid-Treated HEUR Hydrophobically Modified with Bis(2-ethylhexyl)aminoethanol and a Methoxy Polyethylene Glycol Comparative Example 3 was prepared substantially as described in Example 4 except that the solid polymer (9.0 g) was dissolved in 33.4% p-toluene sulfonic acid (1.2 g, $5.2 \times 10^{-3}$ mol) and water (34.8 g) to form a solution prior to other testing.

Comparative Example 4—Preparation of p-Toluenesulfonic Acid-Treated HEUR Hydrophobically Modified with Bis(2-ethylhexyl)aminoethanol and a Methoxy Polyethylene Glycol Comparative Example 4 was prepared substantially as described in Example 4 except that the solid polymer (9.0 g) was dissolved in 33.4% p-toluene sulfonic acid (4.7 g, $2.0 \times 10^{-2}$ mol) and water (31.3 g) to form a solution prior to other testing.

Comparative Example 5—Preparation of AMPS-Treated HEUR Hydrophobically Modified with Bis(2-ethylhexyl)aminoethanol and a Methoxy Polyethylene Glycol Comparative Example 5 was prepared substantially as described in Example 4 except that the solid polymer (9.0 g) was dissolved in 33.3% 2-acrylamido-2-methyl-1-propanesulfonic acid (AMPS, 1.2 g, $9.0 \times 10^{-3}$ mol) and water (34.8 g) to form a solution prior to other testing.

Comparative Example 6—Preparation of AMPS-Treated HEUR Hydrophobically Modified with Bis(2-ethylhexyl)aminoethanol and a Methoxy Polyethylene Glycol Comparative Example 6 was prepared substantially as described in Example 4 except that the solid polymer (9.0 g) was dissolved in 33.3% AMPS (4.7 g, $3.5 \times 10^{-3}$ mol) and water (31.3 g) to form a solution prior to other testing.

Comparative Example 7—Preparation of a Low Concentration Phosphoric Acid-Treated HEUR Hydrophobically Modified with Bis(2-ethylhexyl)aminoethanol and a Methoxy Polyethylene Glycol Comparative Example 7 was prepared substantially as described in Example 4 except that the solid polymer (9.0 g) was dissolved in 10% phosphoric acid (1.8 g, $4.1 \times 10^{-3}$ mol) in water (34.2 g) to form a solution prior to other testing.

Comparative Example 8—Preparation of Hydrochloric Acid-Treated HEUR Hydrophobically Modified with Bis(2-ethylhexyl)aminoethanol and a Methoxy Polyethylene Glycol Comparative Example 8 was prepared substantially as described in Example 4 except that the solid polymer (9.0 g) was dissolved in 3.6% hydrochloric acid (1.2 g, $2.7 \times 10^{-3}$ mol) in water (34.8 g) to form a solution prior to other testing.

Table 1 summarizes the microbial challenge test results for the examples and comparative examples. Hydrophobe refers to the hydrophobic portion of the HEUR; Acid:Phobe refers to the mol:mol ratio of the acid to the hydrophobic portion; NTMTPA refers to nitrilotris(methylene)triphosphonic acid; p-TSA refers to p-toluene sulfonic acid; bis-2-EHAE refers to bis(2-ethylhexyl)aminoethanol; MPEG 2000 refers to MPEG 2000 methoxy polyethylene glycol; and Test Result refers to the Microbial Challenge Test Result. The As-is viscosity (not shown) was also measured to demonstrate that each of the tested samples exhibited acid suppression; nevertheless, acid suppression was shown not to be predictive of susceptibility to microbial growth.

TABLE 1

Microbial Challenge Test Results for HEURs Quaternized with Various Acids

| Ex. # | Acid (moles) | Hydrophobe | Acid:Phobe | pH | Test Result |
|---|---|---|---|---|---|
| 1 | Phosphoric Acid | Int. 1 | 3.83 | 2.4 | Pass |
| 2 | Phosphoric Acid | Ints. 2 + 3 | 4.32 | 2.1 | Pass |
| 3 | Phosphoric Acid | Bis-2-EHAE | 2.36 | 2.5 | Pass |
| 4 | Phosphoric Acid | Bis-2-EHAE + MPEG | 1.22 | 2.5 | Pass |
| 5 | Phosphoric Acid | Bis-2-EHAE + MPEG | 0.88 | 2.8 | Borderline |
| 6 | HCl | Bis-2-EHAE + MPEG | 1.46 | 1.5 | Pass |
| 7 | $H_2SO_4$ | Bis-2-EHAE + MPEG | 0.54 | 2.0 | Pass |
| 8 | NTMTPA | Bis-2-EHAE + MPEG | 0.40 | 2.2 | Pass |
| Comp. 1 | Polyacrylic acid | Bis-2-EHAE + MPEG | 0.13 | 3.8 | Fail |
| Comp. 2 | Citric Acid | Bis-2-EHAE + MPEG | 2.4 | 3.0 | Fail |
| Comp. 3 | p-TSA | Bis-2-EHAE + MPEG | 0.69 | 3.4 | Fail |
| Comp. 4 | p-TSA | Bis-2-EHAE + MPEG | 2.69 | 1.2 | Fail |
| Comp. 5 | AMPS | Bis-2-EHAE + MPEG | 0.57 | 3.4 | Fail |
| Comp. 6 | AMPS | Bis-2-EHAE + MPEG | 2.24 | 1.4 | Fail |
| Comp. 7 | Phosphoric Acid | Bis-2-EHAE + MPEG | 0.54 | 3.3 | Fail |
| Comp. 8 | HCl | Bis-2-EHAE + MPEG | 0.36 | 3.5 | Fail |

The data show that four acids, phosphoric acid, HCl, $H_2SO_4$, and NTMTPA passed the microbial challenge test, but only three, phosphoric acid, $H_2SO_4$, and NTMTPA passed at an acceptable pH. Liquid products with a pH<2.0 are considered highly corrosive and, therefore, undesirable. The data also show the criticality of pH to passing the challenge test. At a pH of 3.3, phosphoric acid failed; even a pH of 2.8 was not optimal.

The invention claimed is:

1. A composition comprising an aqueous solution of a) a hydrophobically modified ethylene oxide urethane polymer comprising a hydrophobic portion functionalized with a protonated secondary or protonated tertiary amine or a quaternary ammonium salt and b) phosphoric acid or a salt thereof, wherein the composition has a pH in the range of from 2.0 to 2.8.

2. The composition of claim 1 wherein the hydrophobic portion of the hydrophobically modified ethylene oxide urethane polymer is functionalized with a protonated tertiary amine.

3. The composition of claim 2 wherein the pH of the composition is in the range of from 2.1 to 2.7.

4. The composition of claim 3 which has a pH in the range of from 2.1 to 2.5.

* * * * *